Patented Dec. 30, 1924.

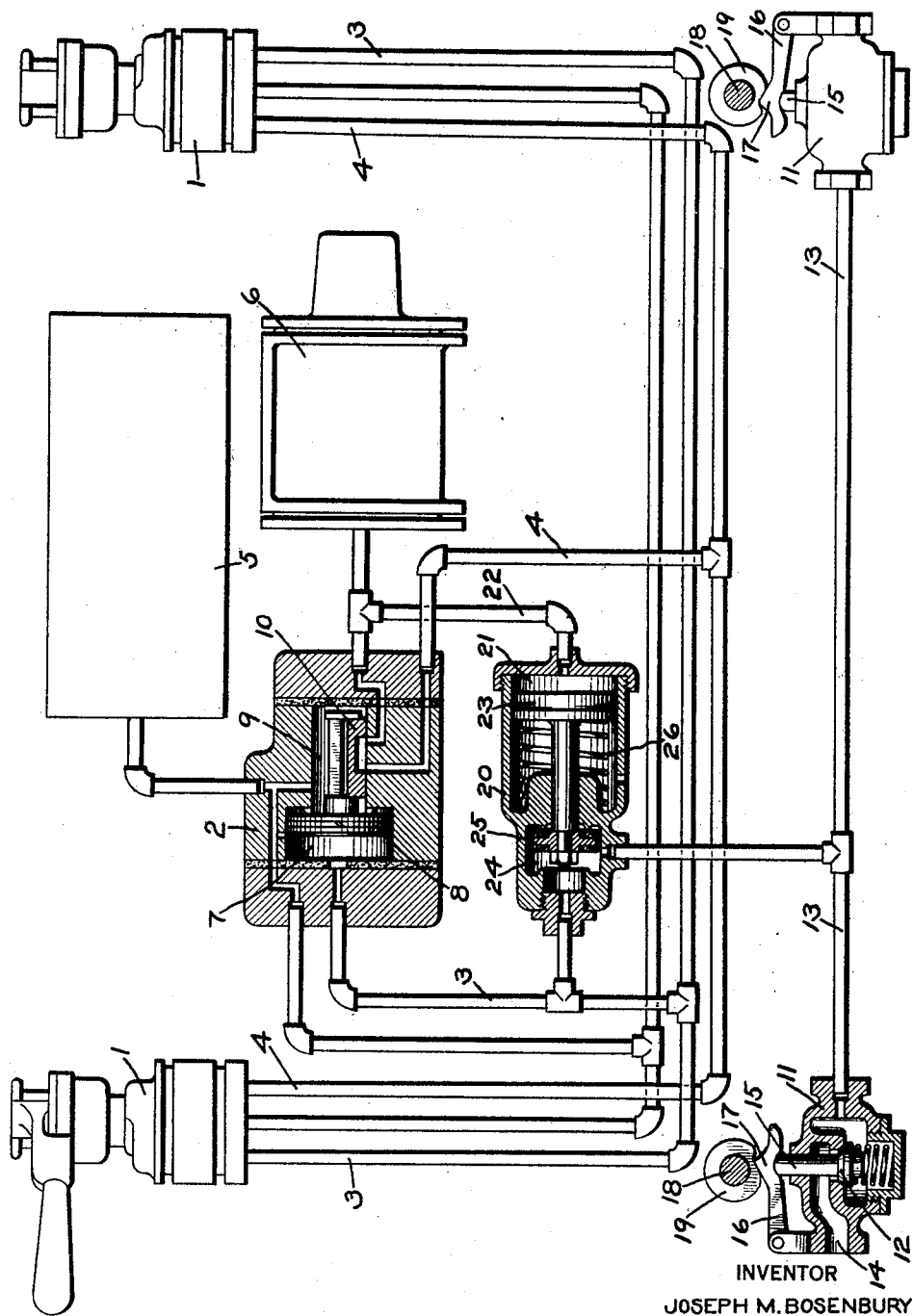

1,520,689

UNITED STATES PATENT OFFICE.

JOSEPH M. BOSENBURY, OF PEORIA, ILLINOIS.

SAFETY CAR-CONTROL DEVICE.

Application filed December 15, 1922. Serial No. 607,216.

*To all whom it may concern:*

Be it known that I, JOSEPH M. BOSEN-BURY, a citizen of the United States, residing at Peoria, in the county of Peoria and State of Illinois, have invented new and useful Improvements in Safety Car-Control Devices, of which the following is a specification.

This invention relates to brakes and car door controlling devices and the principal object of my invention is to provide an interlock between the door controlling mechanism and the brakes so that the brakes will be applied, if the door is opened, unless the brakes have already been applied.

In the accompanying drawing, the single figure is a diagrammatic view of a car brake and door control equipment with my improvement applied thereto.
As an example, one type of equipment with which my invention may be used, comprises a car equipped with side doors and an additional rear door which is used during rush hour periods for rapid loading of passengers.

This rear door is provided with a manual control, so that the door may be opened and closed by a fare collector located outside of the car, who collects the fares as the passengers enter the car and the door may also be operated by the conductor on the car through the action of a fluid pressure door engine or otherwise.

In order to prevent the motorman from starting the car until the rear door is closed, I provide an interlock adapted to prevent the brakes from being released so long as the door remains open and also means for causing an application of the brakes, if the door is open by the conductor or other operative while the car is running.

As shown in the drawing, the brake and door control equipment may comprise a brake valve device 1 at each end of the car, an emergency valve device 2, a brake pipe 3, a straight air pipe 4, a reservoir 5 adapted to be charged with fluid under pressure, and a brake cylinder 6.

The emergency valve device 2 may comprise a casing having a piston chamber 7 connected to the brake pipe 3 and containing piston 8 and a valve chamber 9 connected to the reservoir 5 and containing a slide valve 10 adapted to be operated by piston 8.

At each end of the car, if the car is a double end control car, or at the rear end of a single end car, is provided a valve device 11 operatively associated with the manually operated mechanism for controlling the car door. Said valve device may comprise a casing containing a valve 12 for controlling communication from a pipe 13 to an exhaust port 14. The valve stem 15 may engage a pivotally mounted lever arm 16 having a cam engaging portion 17. The reference numeral 18 indicates a shaft the rotation of which is adapted to open and close the car door and mounted on said shaft is a cam 19 adapted to engage the portion 17 of the lever arm 16.

A valve device 20 is provided comprising a casing having a piston chamber 21 connected to pipe 22, leading to the brake cylinder 6 and containing a piston 23 and having a valve chamber 24 connected to pipe 13 and containing a double seating valve 25 adapted to be operated by the piston 23. When the valve is seated in the position shown in the drawing, the pipe 13 is connected through valve chamber 24 with the brake pipe 3 and when the valve 25 is shifted to its opposite seat, said communication is cut off. The piston 23 is subject to the pressure of a coil spring 26 tending to maintain the piston 23 and valve 25 in the open position as shown in the drawing.

In operation, when the brakes are not applied, there is no fluid pressure in piston chamber 21 and the brake pipe pressure will hold the valve 25 in its outer seated position, so that fluid from the brake pipe 3 will flow into the pipe 13. If the brakes are applied either by straight air or by the operation of the emergency valve device upon a reduction in brake pipe pressure, then fluid will be supplied to brake cylinder 6 and also through pipe 22 to piston chamber 21. The piston 23 will then be shifted to the left, moving the valve 25 to its opposite seat, so as to cut off communication from the brake pipe 3 to pipe 13.

When the door controlling shaft 18 is rotated to open the car door, the cam 19 will operate to shift the lever arm 16 and thus depress the valve stem 15 so as to open the valve 12, but since the valve 25 is now in its closed position, the opening of valve 12 will have no effect.

If at any time the shaft 18 should be operated to open the car door when the brakes are not applied as when the car is running, then the valve 25 being in its open position establishing communication from the brake pipe 3 to the pipe 13, as shown in the drawing, the opening of the valve 12 by the operation of shaft 18 to open the car door will cause a venting of fluid under pressure from pipe 13 and from the brake pipe 3, so that the emergency valve device 2 will be operated in the usual manner to effect an emergency application of the brakes.

Assuming that the brakes have been applied so as to operate the valve device 20 to close communication from the brake pipe to pipe 13 and that the rear door has been opened, as by the fare taker on the outside of the car, if the motorman on the car should release the brakes before the door has been closed by the fare taker, the re-release of fluid from the piston 23 will permit the valve 25 to shift to its open position, so that fluid will be vented from the brake pipe through the open valve 12 and the emergency piston 8 will be operated to shift the slide valve 10 to emergency position, so that an emergency application of the brakes will be effected.

It will thus be seen that the invention operates to cause an application of the brakes, if it is attempted to release the brakes while the car door remains open, and also operates to cause the brakes to be applied if the door is opened while the brakes are released.

Having now described my invention, what I claim as new and desire to secure by Letters Patent, is:

1. In a safety control device, the combination with direct and automatic means for effecting an application of the brakes, mechanism for controlling a car door, and a device associated with said mechanism for causing an application of the brakes by operation of said automatic means upon release of the brakes as applied by said direct means in the door open position of said mechanism.

2. In a safety control device, the combination with a brake cylinder and brake pipe, of means operative upon opening a car door for opening a vent port and a valve device subject to brake cylinder pressure for controlling communication from the brake pipe to said vent port.

3. In a safety control device, the combination with a brake cylinder and brake pipe, of means operative upon opening a car door for venting fluid from the brake pipe and a valve device operated by brake cylinder pressure for closing communication through which fluid is vented from the brake pipe.

4. In a safety control device, the combination with a brake cylinder, brake pipe, brake valve device, and an emergency valve device operated upon a reduction in brake pipe pressure for supplying fluid to the brake cylinder and controlling communication from the brake valve device to the brake cylinder, through which fluid is supplied to and released from the brake cylinder, of mechanism for controlling a car door, a valve controlled by said mechanism for venting fluid from the brake pipe, and means operated by brake cylinder pressure for controlling communication through which said valve vents fluid from the brake pipe.

5. The combination with a brake pipe and brake cylinder, of mechanism for controlling the opening and closing of a car door, a valve operated by said mechanism for controlling the venting of fluid from the brake pipe and a valve device operated at a predetermined pressure in the brake cylinder for cutting off communication from the brake pipe to said valve.

In testimony whereof I have hereunto set my hand.

JOSEPH M. BOSENBURY.